United States Patent [19]

Clapper

[11] Patent Number: 4,512,088
[45] Date of Patent: Apr. 23, 1985

[54] CENTRIFUGAL EXTRACTOR FOR ROTARY AIR FILTERS

[76] Inventor: Millard F. Clapper, R.D. 3 Box 291 Terrace Dr., Binghamton, N.Y. 13901

[21] Appl. No.: 481,728

[22] Filed: Apr. 4, 1983

[51] Int. Cl.³ ............................................. F26B 11/08
[52] U.S. Cl. ........................................ 34/58; 34/184; 210/512.1; 210/781
[58] Field of Search ............................... 34/8, 58, 184; 210/512.1, 781

[56] References Cited

U.S. PATENT DOCUMENTS

| | | | |
|---|---|---|---|
| 3,998,656 | 12/1976 | Grotto | 34/58 |
| 4,090,309 | 5/1978 | Rollins | 34/58 |
| 4,299,245 | 11/1981 | Clapper | 134/140 |
| 4,412,390 | 11/1983 | Grant | 34/58 |
| 4,464,846 | 8/1984 | Itoh et al. | 34/58 |

*Primary Examiner*—Larry I. Schwartz
*Assistant Examiner*—David W. Westphal
*Attorney, Agent, or Firm*—Charles S. McGuire

[57] ABSTRACT

Apparatus for extracting fluid from rotary air filters including novel support means upon which an individual filter is mounted and means for imparting rotation thereto for effecting centrifugal extraction. The support means includes a base member, which receives the rotational motive power, and a lower support member resiliently biased in spaced relation to the base member in a manner minimizing the possibility of damage due to vibration or unbalance. Upper support means include a pair of annular rings, one of which is vertically adjustable with respect to the other, which encircle the mounted filter. Annular discs having central openings matched to the outside diameter of the mounted filter may be removably mounted upon the vertically adjustable support ring. The filters rest upon a conical support or upon a spacer member which is used with filters of short axial length, and are constrained about their peripheries by the rings and/or removable discs of the upper support means, but need not be constrained on top.

10 Claims, 6 Drawing Figures

| NO. | "A" DIM. | "B" DIM. |
|---|---|---|
| 0 | 20" | 7 1/2" |
| 1 | " | 8 1/2" |
| 2 | " | 9 1/4" |
| 2A | " | 10 1/2" |
| 3 | " | 11" |
| 3A | " | 11 1/2" |
| 4 | " | 12" |
| 5 | " | 13" |

CENTRIFUGAL EXTRACTOR FOR ROTARY AIR FILTERS

BACKGROUND OF THE INVENTION

The present invention relates to centrifugal extractors and, more particularly, to improvements in equipment for extracting moisture from rotary filter elements following a washing operation.

Many types of vehicles and equipment utilize in the air intakes of their engines a filter in the form of a suitable filtering media contained between inner and outer concentric cylinders of perforated metal, closed at the ends by annular metal discs. As the media collects particles from the air passing therethrough it becomes increasingly more difficult for air to flow at the required rate, making replacement necessary. The working environment of some equipment requires replacement of the filters at very frequent intervals.

Due to the cost and construction of this type of rotary filter, it is more economical to restore the media to more or less its original condition by washing, rinsing and drying, rather than discarding the unit after a single use. To this end, the prior art includes a number of types of apparatus for washing and/or rinsing such filter elements, including applicant's U.S. Pat. No. 4,299,245. Centrifugal-type extractors for spinning such filter units to extract a significant portion of the fluid therefrom following the washing and rinsing operation has also been devised, the most pertinent example of which applicant is aware being that of U.S. Pat. No. 4,090,309. The apparatus of the present invention differs from such prior art principally in the provision of the features set forth in the following objects of the invention.

In a general sense, the principal is to provide novel and improved centrifugal extraction apparatus for removing fluid from rotary air filter units following washing.

More specifically, objects of the invention are to provide centrifugal extraction equipment having improved mounting means for the rotating support for open, cylindrical air filters, and to provide simple yet practical means for supporting rotary air filter having a wide variety of outer diameters and axial lengths upon the rotating portion of centrifugal extraction apparatus.

Other objects will in part be obvious and will in part appear hereinafter.

SUMMARY OF THE INVENTION

The equipment of the present invention includes a housing which encloses the filter in process, i.e., which is being rotated for centrifugal extraction of the liquid contained therein, and its rotating support means. A hinged cover on top of the housing provides access to the interior for mounting and removing the filter units. An electric drive motor is connected by a belt to a pulley on the end of a shaft extending through the bottom of the housing with appropriate seals and bearings.

A base member of the rotating support means is attached to the upper end of the shaft, within the housing. A support plate is yieldably supported in spaced relation to the base member by a plurality of bolts which extend through aligned openings in the base member and support plate, and are biased apart by compressed coil springs surrounding the bolts. A central support member having a conical lower portion and cylindrical upper portion is attached to the support plate at its center.

A plurality of hollow tubes are affixed to and extend upwardly from equally spaced points on the support plate. A first annular ring is attached to the tops of the hollow tubes and has openings aligned therewith. A second annular ring carries a second plurality of tubes which extend downwardly therefrom for telescoping engagement with the hollow tubes on the support plate, thereby providing vertical adjustability of the second ring with respect to the first. Detent pins are provided for releasably fixing the relative positions of the telescoping tubes.

The central openings in the vertically aligned annular rings are large enough to accept the largest outer diameter of filter unit, e.g., 14 inches, contemplated for use with the extractor apparatus of the invention. A filter of this diameter may thus be placed in the housing, through the two annular rings to rest upon the conical portion of the central support member. The vertical position of the upper annular plate is adjusted in accordance with the axial length of the filter unit, to encircle the latter slightly below its upper end.

A plurality of annular discs are provided, each having an outer diameter slightly less than that of the two annular rings and different, predetermined inner diameters corresponding to the nominal outside diameters of a variety of filter units with which the extractor apparatus is contemplated for use. When filter units having outside diameters smaller than that of the largest units to be processed, a disc of appropriate inner diameter is chosen and placed upon the upper annular ring with a pair of fixed lugs on the upper ring surface extending through openings in the disc. Thus, the filter unit will be laterally constrained either by the two annular rings or by the selected disc.

A lower spacer element is also provided which may be placed over the central support member to serve as an underlying support for filter units of short axial length so that they will extend through and be laterally constrained by the superposed annular rings or annular disc.

BRIEF DESCRIPTION OF THE DRAWINGS

FIG. 5 is a perspective view of a lower spacer member for optional use with the extractor apparatus.

DETAILED DESCRIPTION

Figure 1:
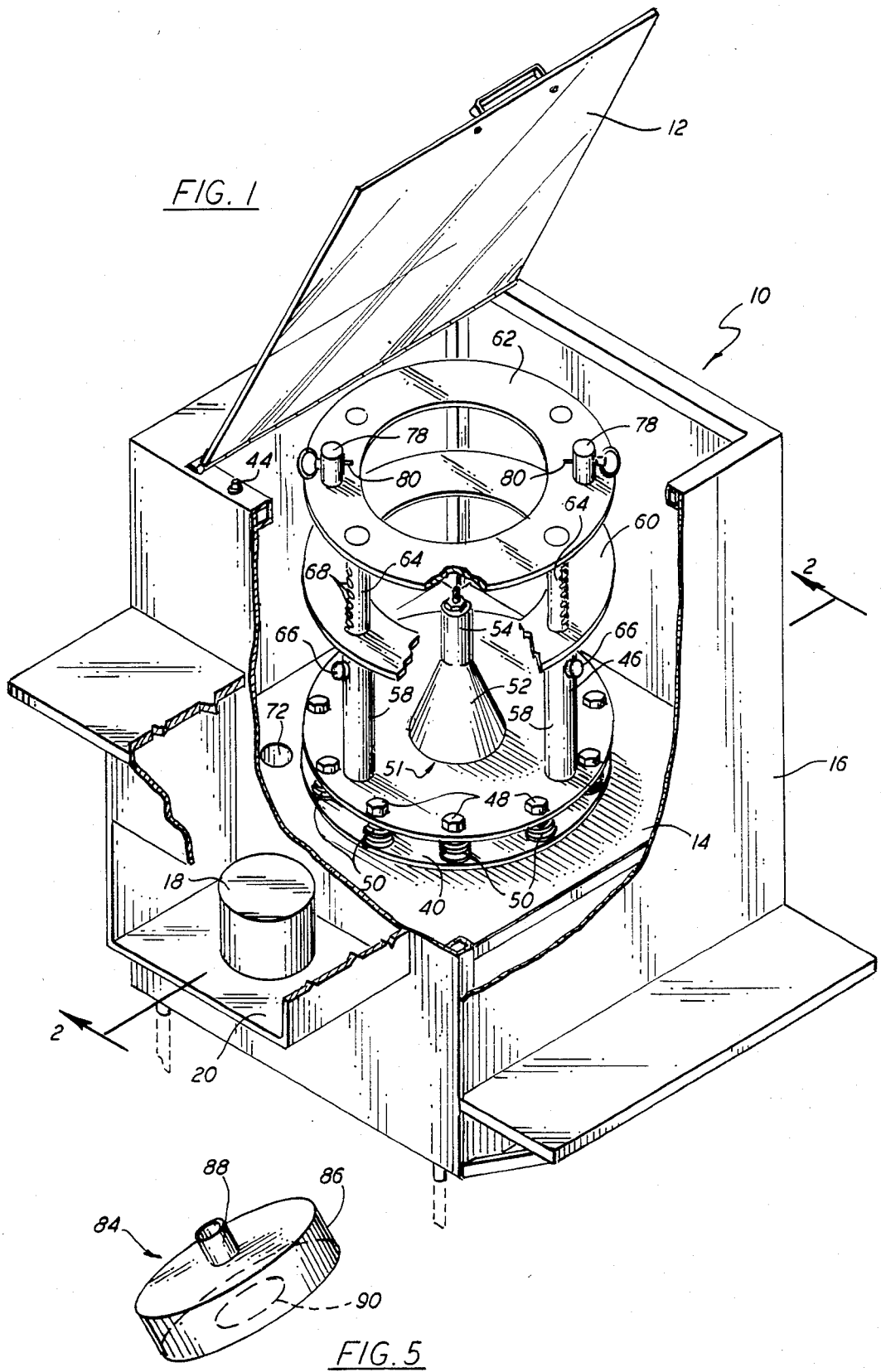
FIG. 1 is a perspective view, with portions broken away, of a preferred embodiment of the extractor apparatus of the invention.

Turning now to the drawings, the extractor apparatus comprises a box-like housing 10 having a hinged cover or lid 12 on its upper side, lower wall 14 and side walls 16. Lid 12 is preferably of Plexiglas, or other transparent material, to permit viewing the interior of the apparatus during operation. Drive motor 18 is supported on shelf 20 at one side of housing 10 with its drive shaft 22 directed downwardly, through shelf 20. Pulley 24 is mounted on the end of shaft 22 and transmits rotation through belt 26 to pulley 28, carried on the lower end of shaft 30.

Conventional seals 32 and bearings 34 provided a sealed opening in bottom housing wall 14 through which shaft 30 extends. The upper end of shaft 30 carries plate 36 which is attached by bolts 38 to base member 40 of the rotatable filter support means. Rotation is thus imparted to the support means through the shafts, pulleys and belt, from motor 18 which is connected to an appropriate power source, indicated in FIG. 2 by reference numeral 42, through switch 44. This switch is mounted on the upper surface of housing 10 for actuation by lid 12, whereby power may be supplied to motor 18 only when the lid is closed. If desired, a second, manually operable, switch may be provided so that lid 12 may be closed without actuating motor 18, but switch 44 would in any case act as a safety means, preventing inadvertent actuation while a filter unit is being placed upon or removed from, the rotatable support means. Also preferably provided is a conventional, selectively actuated, speed control means (not shown) for motor 18.

Support plate 46 is mounted upon base member 40 by means of bolts 48 which extend through aligned openings in member 40 and plate 46 which are biased in spaced relation by coil springs 50 which encircle each bolt and are compressed between the base member and support plate. A central support member 51 having lower, conical portion 52 and upper, cylindrical portion 54 is affixed to support plate 46 by a threaded shaft extending through central openings in both the support member and plate, secured at the top and bottom by nuts 56.

Affixed to and extending upwardly from the upper surface of support plate 46 at evenly spaced intervals are hollow tubes 58, a total of four in the disclosed embodiment. A first annular ring 60 is fixedly attached to the upper ends of tubes 58, having openings aligned with the tubes to allow access from above to the hollow interior of the tubes. Second annular ring 62 has fixedly attached to and extending downwardly from the lower surface thereof a second plurality of tubes 64 for slidable, telescoping engagement with tubes 58. Spring loaded detent means 66 on tubes 58 and a vertically aligned row of openings 68 in each of tubes 64 provide means for releasably fixing the vertical position of ring 62.

Figure 2:
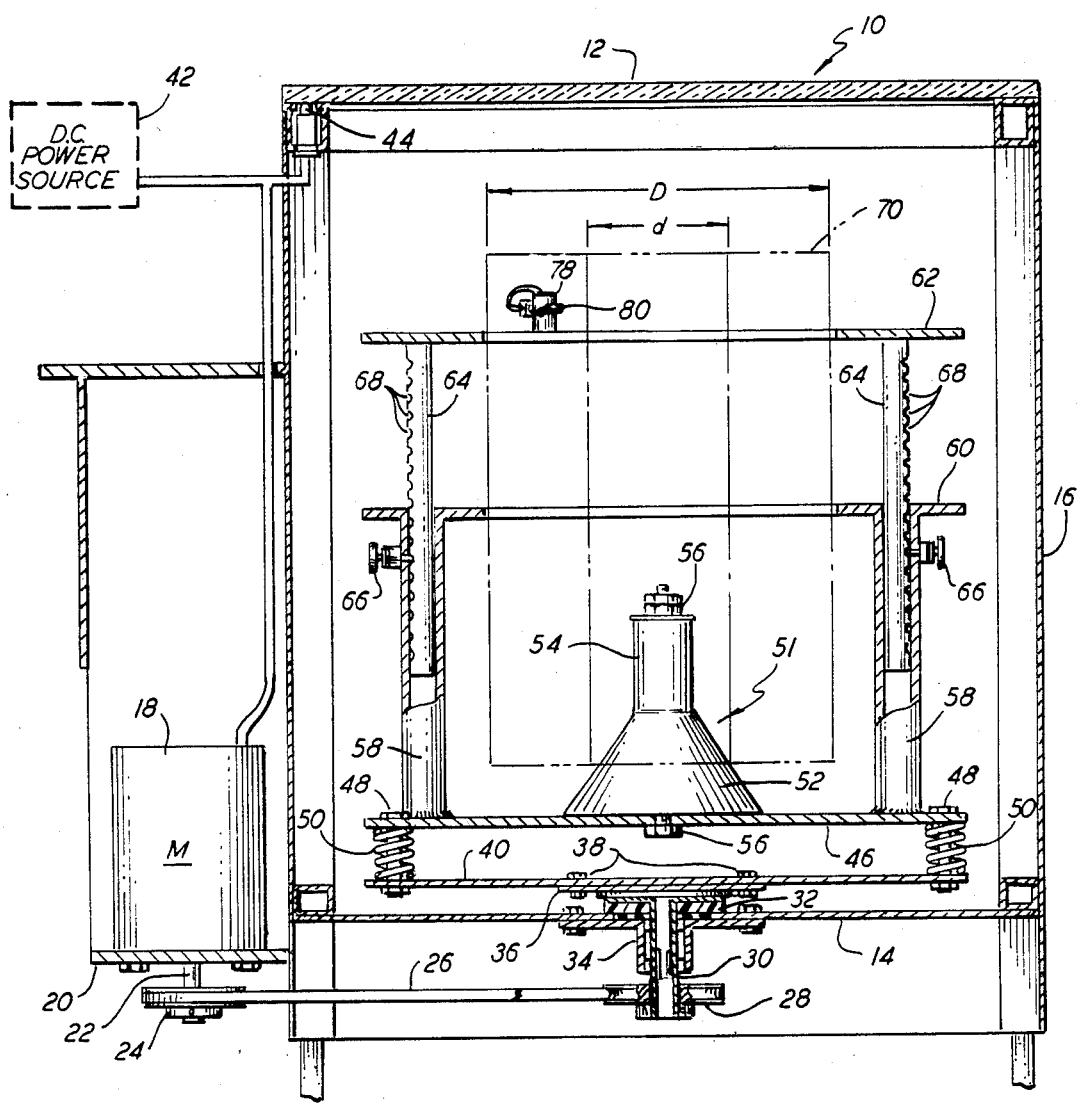
FIG. 2 is a front elevational view in section on the line 2—2 of FIG. 1, showing a rotary filter unit in phantom lines mounted in the apparatus.

As shown in phantom lines in FIG. 2, a conventional rotary air filter 70, of a type commonly used on many types of heavy equipment and vehicles, is placed within housing 10, through the openings in rings 60 and 62. Filter 70 is cylindrical, having an outer diameter D, with a cylindrical opening of diameter d therethrough. The body of filter 70 is formed from concentric cylinders of perforated aluminum, or other such material, closed at each end by annular rings and contains a suitable filtering media for removing dust and other solid particles from air passing therethrough when in use in the associated equipment.

Filter 70 represents the largest filter, in terms of outer diameter D, which the extractor apparatus of the illustrated embodiment is designed to process. This is determined by the diameter of the openings in annular rings 60 and 62, which is slightly larger than diameter D. Filter 70 rests upon central support member 51 at a point on conical portion 52 thereof having a diameter equal to dimension d. The vertical height of ring 62 is adjusted in the manner previously described to a position a short distance (which is by no means critical) below the upper end of filter 70.

As described in the introductory part of the present specification, filter 70 has been used to the point that it requires cleaning, and has been washed and rinsed to remove the collected dust, etc. from the media. Following the washing and rinsing operation, filter 70 is placed in housing 10 as described, lid 12 is closed and power supplied to motor 18, thereby rotating the elements attached to plate 36 at a desired speed. Filter 70 rests upon central support member 51 and is laterally constrained by annular rings 60 and 62, but requires no support or constraint on the top. As filter 70 is rotated a significant portion of the water and/or other cleaning and rinsing fluids contained thereby are extracted by centrifugal force, being removed from housing 10 through drain opening 72 (FIG. 1).

Figure 3:
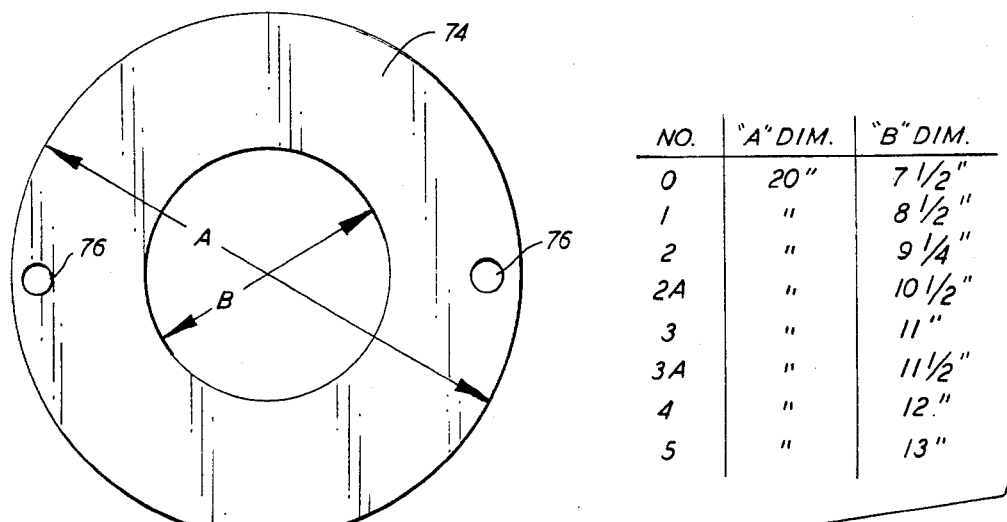
FIG. 3 is a plan view of an annular disc for optional use with the apparatus of FIGS. 1 and 2, with an accompanying table of suggested dimensions of such discs.

Turning now to FIG. 3, there is shown a flat, annular disc 74 having outer and inner diameters indicated as dimensions "A" and "B", respectively. A pair of openings 76 are provided on opposite sides of disc 74 for alignment with lugs 78 on the upper surface of annular ring 62. A set of discs such as 74 are provided for use with the extractor apparatus, all discs in the set having the same "A" dimension, but different "B" dimensions. The table shown in FIG. 3 provides a listing eight suggested disc designations ("No."), all discs having an "A" dimension of 20", and various "B" dimensions corresponding to (or slightly larger than) the outside diameter D of standard sizes of filter units with which the extractor apparatus is contemplated to be used. The suggested "B" dimension values in the table correspond to the vast majority of rotary filter diameters in use at the present time which would be processed in the extractor apparatus of the invention. Discs such as 74 may be fabricated of plywood or other such materials and thus do not add significantly to the cost of the system.

Figure 4:
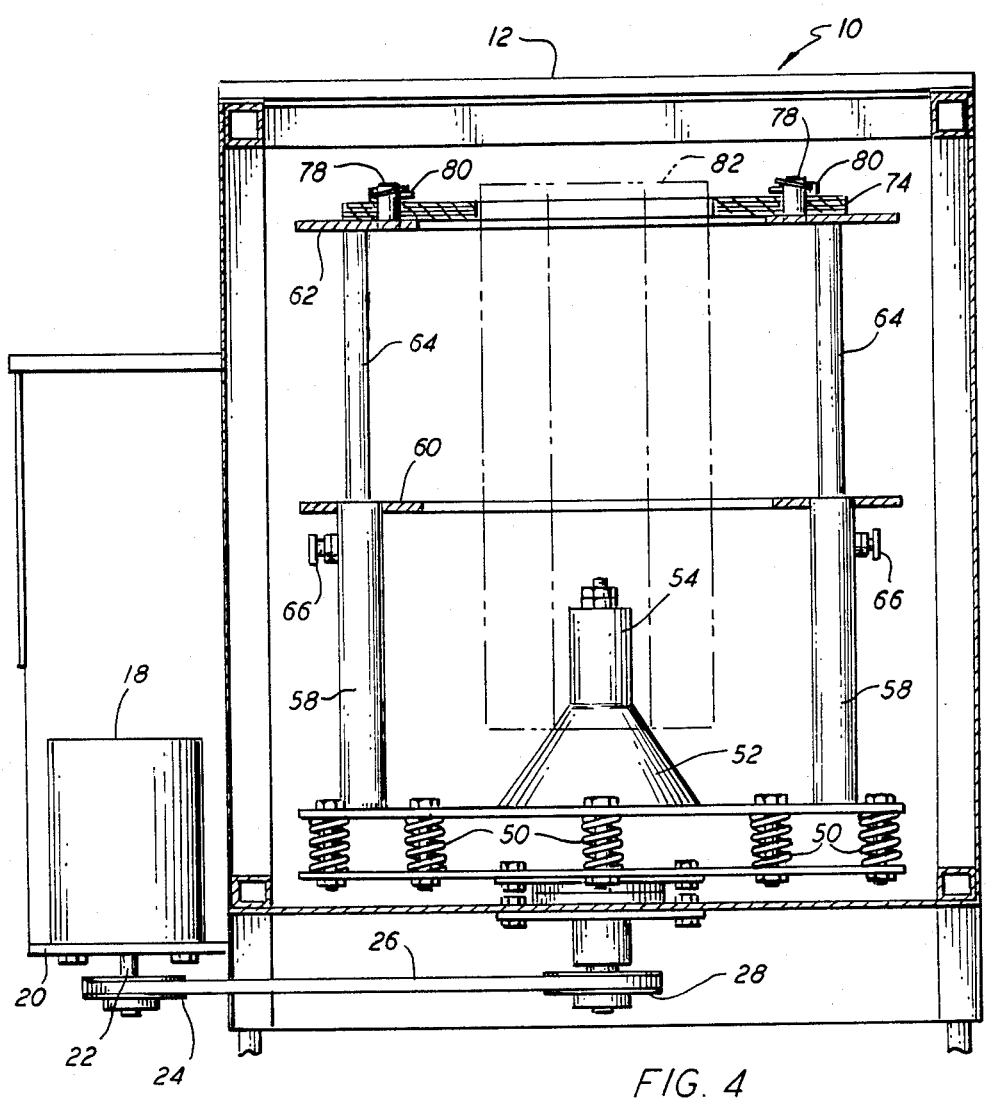
FIG. 4 is a front elevational view of the apparatus, with portions in section, showing the use of the annular discs with a second size of filter unit.

When a filter having an outside diameter smaller than "D" is to be processed, a disc is chosen with a "B" dimension corresponding to the filter OD and is placed on ring 62 with lugs 78 extending through openings 76. Pins 80 are then inserted through holes in lugs 78 to secure the disc on the ring. The filter to be processed is inserted through the disc opening, to rest upon central support member 51 and the vertical position of ring 62 adjusted as before. Such an arrangement is shown in FIG. 4, wherein filter unit 82 is mounted in housing 10 and will be laterally constrained at a position slightly below its upper end by disc 74, all other portions of the apparatus being the same as in FIGS. 1 and 2 and therefore indicated by common reference numerals.

Figure 6:
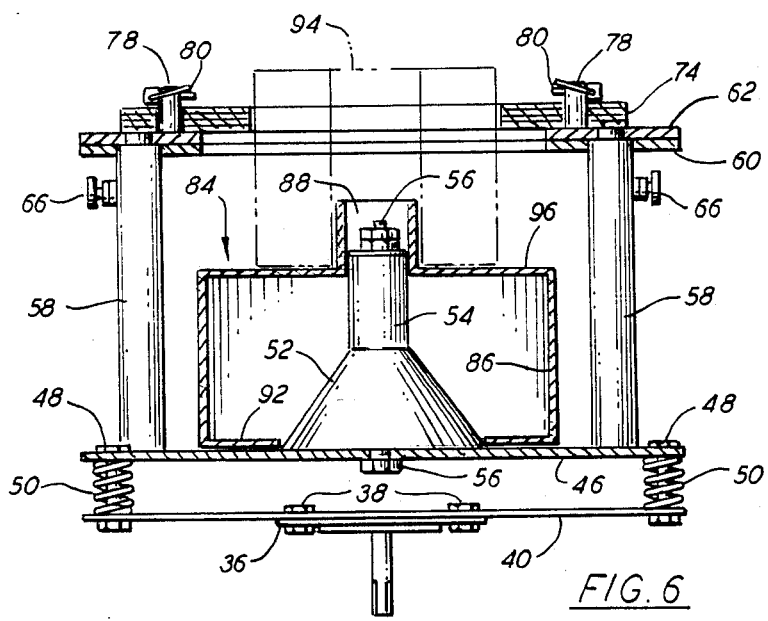
FIG. 6 is a front elevational view of the rotatable support means, showing the use of both the annular discs and the lower support member with a third size of filter unit.

Provision is also made for the processing of filter units having an axial length less than the vertical distance between the position at which it would be supported on central support member 51 and ring 60. Referring to FIGS. 5 and 6, adapter unit 84 includes lower and upper hollow cylindrical portions 86 and 88, respectively. Opening 90, having a diameter slightly larger than that at the base of conical portion 52 of support member 51, is provided in lower wall 92 of adapter unit 84, and upper portion 88 thereof is open at its upper end. Adapter unit 84 is dimensioned for placement over central support member 51 as shown in FIG.

6, whereby filter units of relatively short axial dimensions, such as that indicated by reference numeral 94 may rest upon flat, annular surface 96 to extend through and be laterally restrained by rings 60 and 62 or one of discs 74 mounted upon the latter. Operation is the same as previously described.

From the foregoing it will be seen that the objects of the invention are achieved by the disclosed extractor apparatus, which provides for operation with rotary filter units of a wide variety of diameters and axial lengths. By way of example, a commercial model of such apparatus is capable of operation with filters from $7\frac{1}{2}$ inches to 14 inches in outside diameter and from 8 inches to 23 inches an axial length. The filter units may be very easily and quickly mounted in and removed from the apparatus, simply resting upon a lower support and requiring no upper support or constraint. Likewise, adaptation of the unit for use with filter units of differing diameters and lengths is very simple, quick and inexpensive, requiring only the insertion and removal of suitably dimensioned annular discs and/or vertical adapter units. Furthermore, the resilient mounting of the filter-carrying portions of the apparatus relative to other rotatable portions helps to compensate for any wobble or out-of-balance conditions which may be encountered during rotation.

What is claimed is:

1. Centrifugal extractor apparatus for removing fluid from rotary air filter units following washing thereof, said apparatus comprising, in combination:
   (a) an enclosed housing having a lid movable between open and closed positions;
   (b) a drive motor mounted outside said housing;
   (c) rotatable means within said housing adapted to support in an axially vertical orientation a rotary filter unit, said filter unit having outer and inner cylindrical walls, said outer wall having a predetermined maximum diameter, for rotation thereof to extract fluids by centrifugal force, said rotatable means including:
      (i) a base member;
      (ii) a first annular ring having predetermined inner and outer diameters, said inner diameter being slightly larger than said maximum diameter;
      (iii) first support means fixedly supporting said first ring in spaced, parallel relation to said base member;
      (iv) a second annular ring of substantially the same inner and outer diameters as said first ring;
      (v) second support means adjustably supporting said second ring for axial movement in superposed relation to said first ring;
      (vi) means for releasably fixing the position of said second ring with respect to said first ring; and
      (vii) a central support member extending upwardly from an anchored position below said first ring, coaxially therewith, and having at least an upper portion of a diameter not greater than that of said inner cylindrical wall; and
   (d) means for transmitting rotation from said motor to said rotatable means.

2. The invention according to claim 1 wherein said first support means includes a plurality of hollow, vertically disposed tubes.

3. The invention according to claim 2 wherein said first support means further includes a lower support plate to which said tubes are attached, and resilient mounting means by which said support plate is attached to said base member.

4. The invention according to claim 3 wherein said resilient mounting means comprises a plurality of bolts extending through vertically aligned openings in said support plate and said base member, and a coil spring surrounding each of said bolts and compressed between said support plate and base member to bias the two in spaced relation.

5. The invention according to claim 2 wherein said second support means includes a plurality of elongated members extending downwardly from said second ring for telescoping engagement with said hollow tubes.

6. The invention according to claim 5 wherein said means for releasably fixing the positions of said first and second rings comprise detent means selectively engageable between said tubes and said elongated members.

7. The invention according to claim 3 wherein said central support member is mounted upon and extends upwardly from said support plate.

8. The invention according to claim 7 wherein said central support member includes a lower, conical portion and an upper, cylindrical portion.

9. The invention according to claim 1 and further including at least one annular disc having an outer diameter greater than and an inner diameter smaller than said second ring inner diameter, and means for releasably mounting said disc in overlying, contacting relation to said second ring, said disc being employed with rotary filter units having an outer wall diameter slightly less than said disc inner diameter.

10. The invention according to claim 9 and further including a vertical adapter unit for selective placement in surrounding relation to at least a part of said central support member to provide a horizontally disposed surface for supporting a filter unit in a higher position than that in which it would be supported by said central support member.

* * * * *